Figure 1:
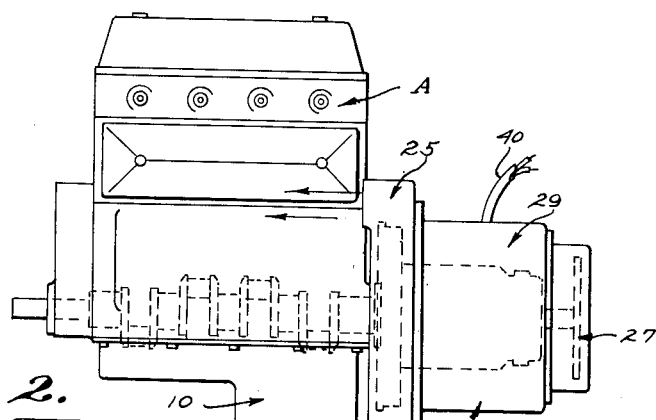

Feb. 14, 1956  M. W. BRAINARD  2,735,030
ELECTRICAL GENERATOR
Filed March 3, 1952  4 Sheets-Sheet 1

INVENTOR.
Maurice W. Brainard
BY
Attorney

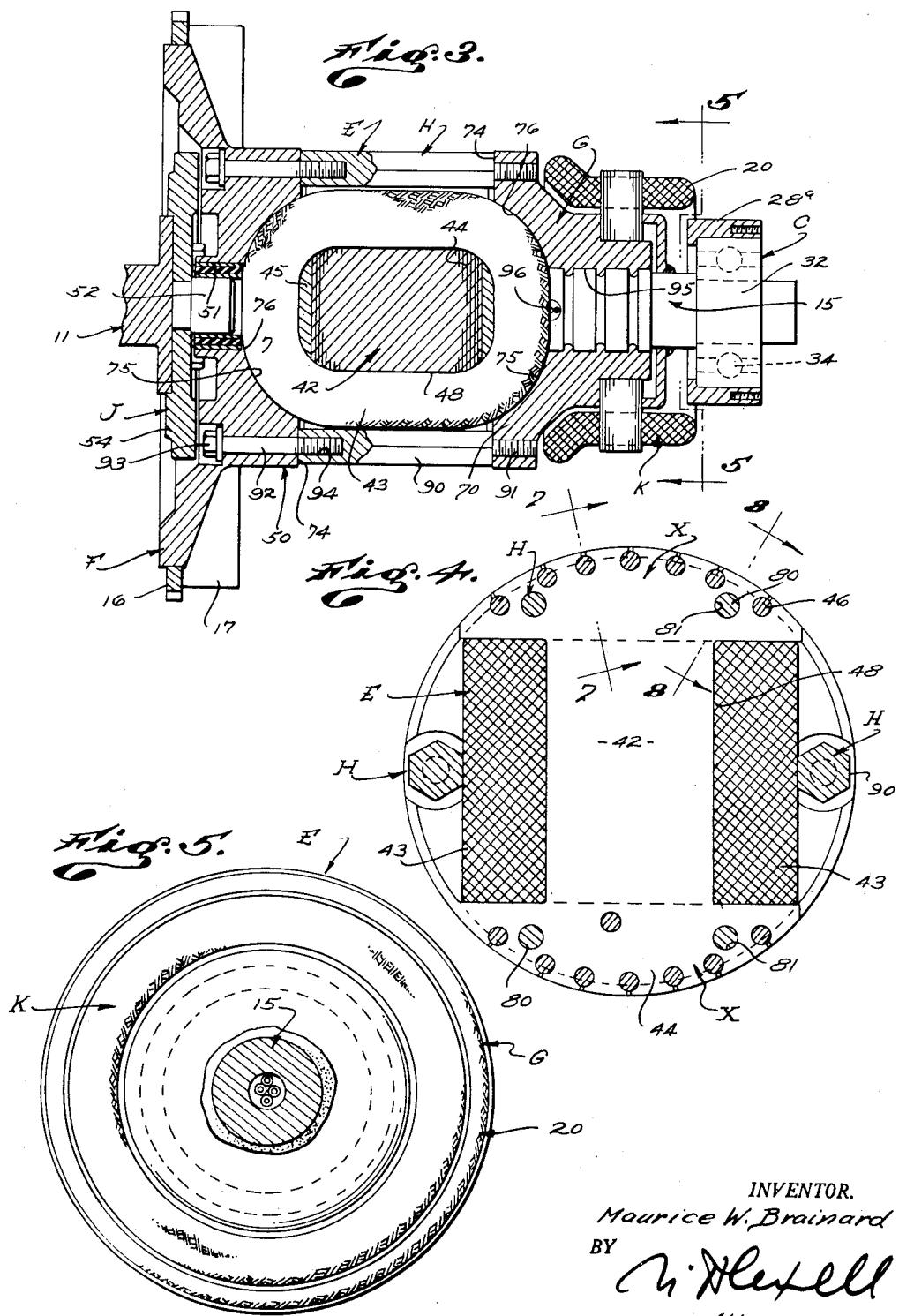

Feb. 14, 1956 M. W. BRAINARD 2,735,030
ELECTRICAL GENERATOR
Filed March 3, 1952 4 Sheets-Sheet 3

INVENTOR.
Maurice W. Brainard
BY
Attorney

Feb. 14, 1956     M. W. BRAINARD     2,735,030
ELECTRICAL GENERATOR
Filed March 3, 1952     4 Sheets—Sheet 4
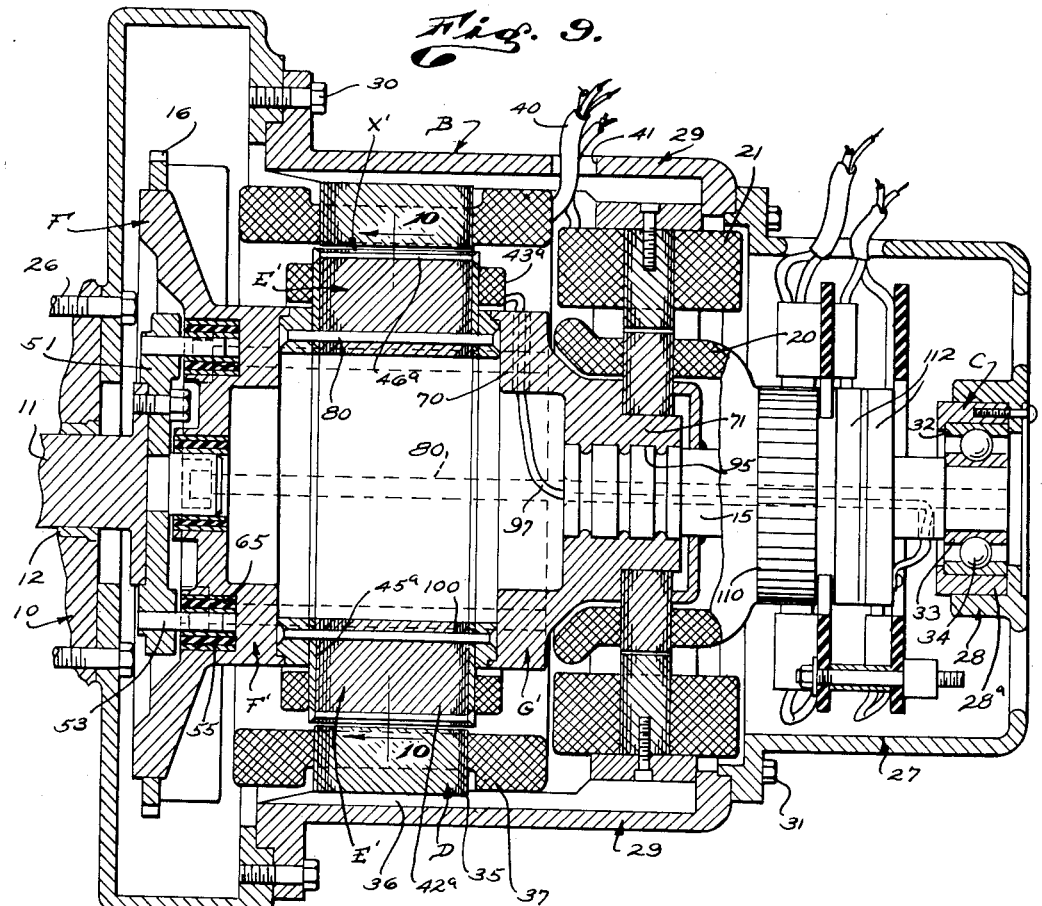
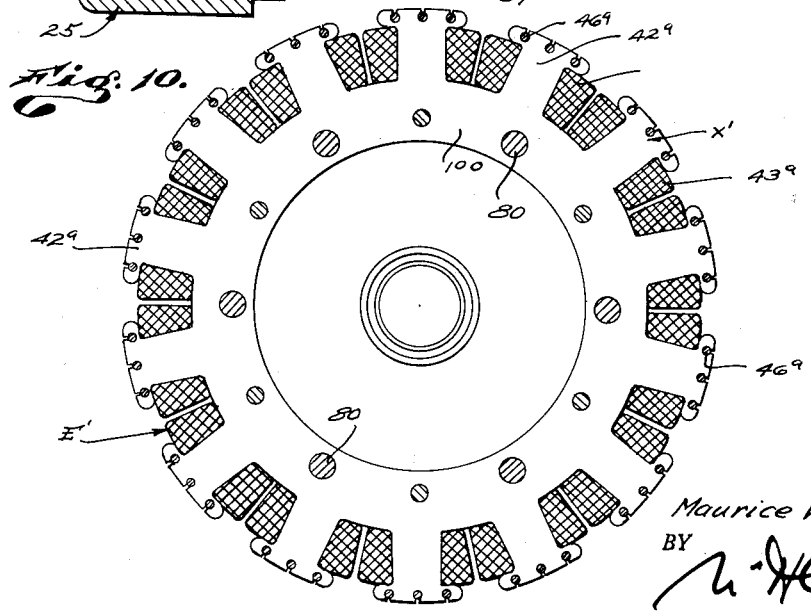
INVENTOR.
Maurice W. Brainard
BY
Attorney

United States Patent Office 2,735,030
Patented Feb. 14, 1956

2,735,030

ELECTRICAL GENERATOR

Maurice W. Brainard, Los Angeles, Calif., assignor of one-half to O'Keefe & Merritt Company, Los Angeles, Calif., a corporation of California Application March 3, 1952, Serial No. 274,581

1 Claim. (Cl. 310—261)

This invention has to do with an electrical machine such as a generator, and it is a general object of the invention to provide an electric generator or rotary electric machine of simple practical improved construction.

Rotary electric machines such as generators are generally characterized by a rotor having a central shaft extending through it from one end to the other and, carrying or including pole-piece windings and other elements all of which combine to make a heavy, rather complicated and expensive construction.

It is a general object of this invention to provide a rotary electric machine wherein the rotor is constructed to be without the usual or conventional shaft extending through it from one end to the other.

Another object of this invention is to provide a rotor for an electric machine so constructed as to be made up of a plurality of separable elements each of which is such that it can be manufactured easily and inexpensively or established in finished form prior to being assembled in the rotor. With the construction provided by the present invention the element or elements of the rotor including or involving windings may be constructed and completed free of the other or bulky elements of the rotor, thus making for simple, convenient, inexpensive rotor construction.

It is another object of this invention to provide a rotor construction of the general character referred to which is such as to effectively and practically include or accommodate various essential rotor elements and also auxiliary elements while maintaining an over-all construction which is such that it can be inexpensively constructed and easily and quickly assembled.

The construction provided by the present invention can in practice be incorporated in rotary electric machines of various types or forms, and it will be referred to, for example, as being applied to or incorporated in electrical generators, and the particular generators hereinafter described are of the type wherein there is a fixed armature carried by the case of the machine and a rotating field which is carried by or made a part of the rotor. For purpose of example, generators will be described disclosing two different and typical arrangements of auxiliary equipment in connection with the rotor.

The machine provided by the present invention or in which the invention can be incorporated includes generally, a fixed case and in a typical situation the case can be secured to a prime mover, for instance to the housing of an engine, or the like. In a preferred construction the case is sectional and includes an inner end section which is applied to the engine, an outer end section which is applied to the engine, an outer end section which carries a rotor bearing and a middle or center section between the end sections. A suitable fastening means secures the several case sections together. The two principal generating elements of the machine; that is, the field and armature of the machine, are locked within the case and in the particular situation set forth, the armature is annular in form and is fixed in the case preferably in the center section of the case while the field is carried by the rotor which operates within the case. The rotor is a rigid unit or assembly, having one end carried by or coupled to the drive shaft of the engine while the other end is rotatably supported by the bearing in the outer end section of the case. The rotor preferably includes an inner head coupled to the drive shaft of the engine, an outer head carrying a trunnion which is supported in the bearing of the case a means is provided coupling the heads with the field element of the machine confined between them. It is preferred that the rotor be coupled to or driven by the engine shaft through a suitable cushioning means and the heads of the rotor in addition to carrying the field element between them may carry auxiliary elements, as circumstances require. In a typical case the inner head may include or carry a ring gear of a starting mechanism, vanes or blades of an air circulating means, etc. In one example to be described the outer head carries an element of an exciter, a commutator, slip rings, etc. In another case the outer head carries an element of an exciter and also a rectifier. With the rotor construction provided by the invention there is no shaft or like element extending continuously through the rotor from one end to the other, but rather the space between the heads of the rotor is in effect clear or free to accommodate the electrical element of the generator, for instance, the field element, and that element of the machine can, therefore, be constructed in a manner to be highly efficient and so that it is simple and practical of manufacture.

Figure 2:
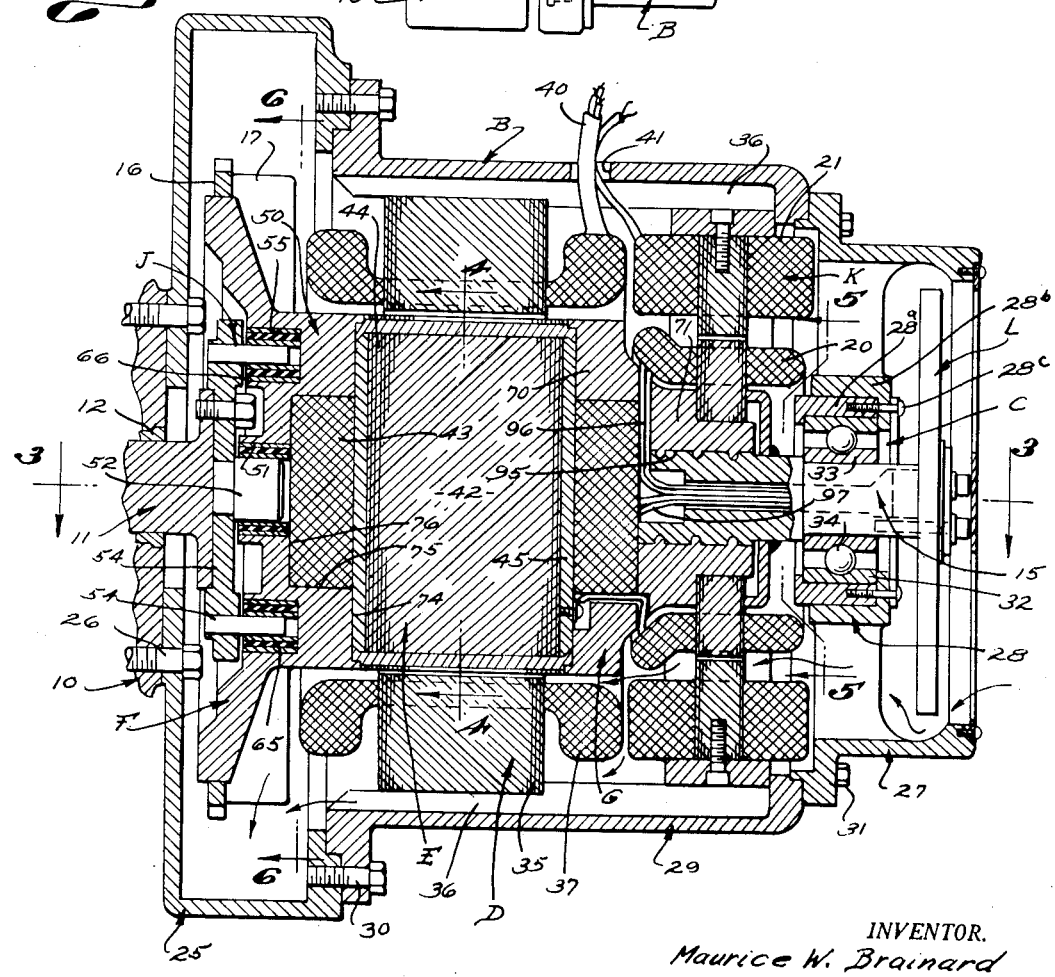
Figure 6:
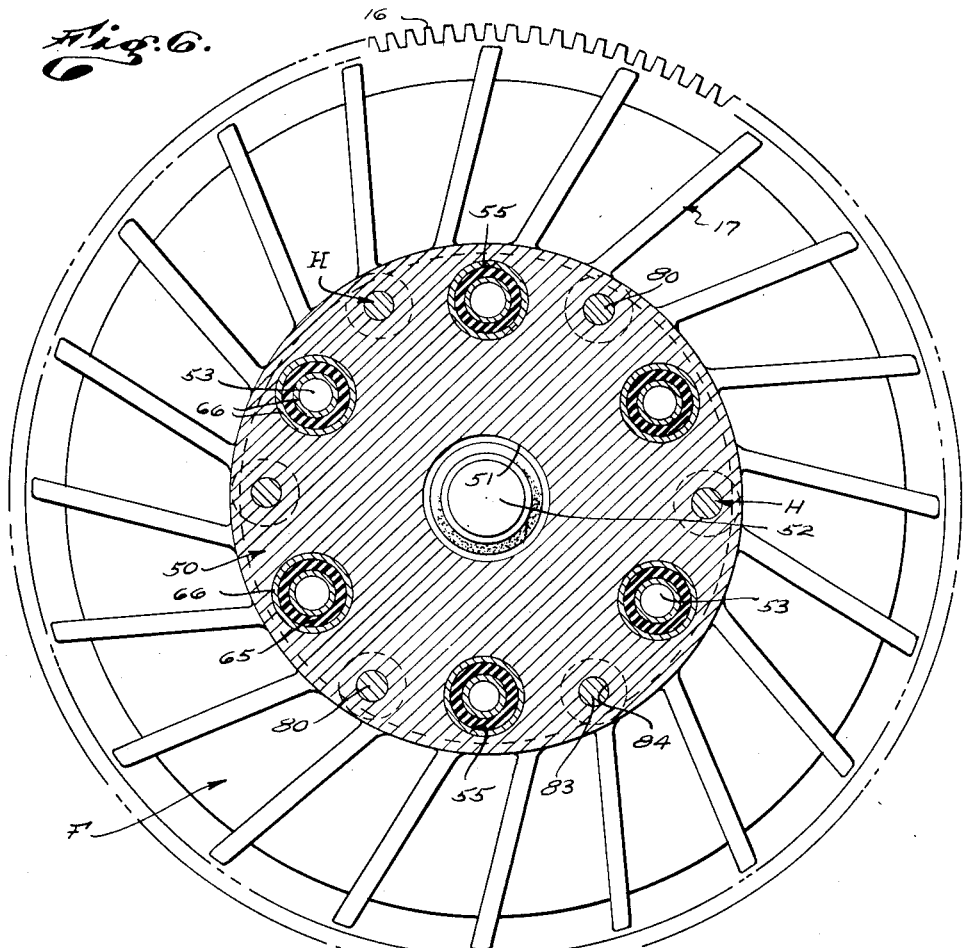
Figure 7:
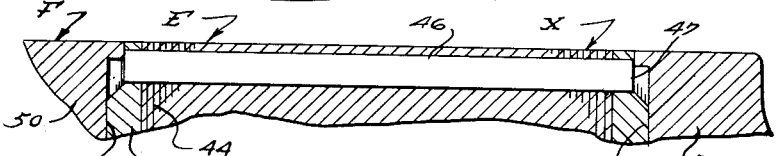
Figure 8:
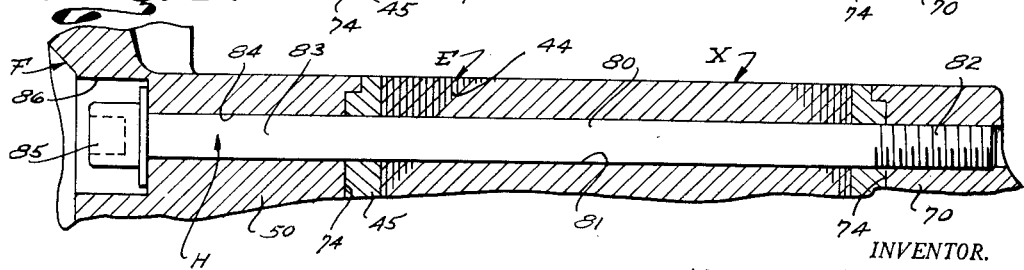

The various objects and features of my invention will be fully understood from the following detailed description of typical preferred forms and applications of the invention, throughout which description references are made to the accompanying drawings, in which:

Fig. 1 is a side elevation of a typical prime mover or gas engine showing a generator embodying the invention applied directly to the engine to be operated thereby. Fig. 2 is an enlarged longitudinal detailed sectional view of the electric machine or generator showing it coupled to engine parts. Fig. 3 is a fragmentary view of a portion of the machine showing primarily the rotor and elements connected directly to the rotor, being a view taken substantially as indicated by line 3—3 on Fig. 2. Fig. 4 is a transverse sectional view of the rotor, being a view taken as indicated by line 4—4 on Fig. 2. Fig. 5 is a detailed transverse sectional view of the rotor, being a view taken as indicated by line 5—5 on Fig. 3. Fig. 6 is an enlarged transverse sectional view of the rotor, being a view taken as indicated by line 6—6 on Fig. 2. Fig. 7 is an enlarged detailed sectional view of a portion of the rotor, being a view taken as indicated by line 7—7 on Fig. 4. Fig. 8 is an enlarged detailed sectional view of a portion of the rotor, being a view taken as indicated by line 8—8 on Fig. 4. Fig. 9 is a detailed sectional view of a rotary machine embodying the invention, being a view similar to Fig. 2 and showing a somewhat different form of construction, and Fig. 10 is a detailed transverse sectional view of the rotor employed in the machine shown in Fig. 9, being a view taken as indicated by line 10—10 on Fig. 9.

Referring first to the form of the invention shown on sheets one, two and three of the drawings, the rotary electric machine embodying the present invention is directly applied to and driven by a prime mover A in the form of an internal combustion engine. For the purpose of the present invention, it is sufficient to refer to the engine A as including a housing 10 and a drive shaft 11 supported by an engine bearing 12 and projecting from the housing 10.

The machine embodying the present invention includes, generally, a case B shown as directly connected to the engine A and carrying a bearing means C. The machine includes two principal electrical elements; namely, an armature D and a field element E. In the case under consideration the armature D is carried by or mounted stationary in the case B, while the field element E is carried by and made a part of a rotor which includes also an inner head F, an outer head G and coupling means H connecting the heads. A suitable means J provides driving engagement between the engine shaft 11 and the inner head F of the rotor and a trunnion portion 15 of the outer head G is carried by the bearing means C which is supported by the case B. In the machine under consideration the ring gear 16 of a starting mechanism is carried by the inner head F as are the blades or vanes 17 of an air circulating means. The armature element 20 of an exciter K is carried by the outer head G while the field element 21 of the exciter is carried by the case B. A rectifier L is carried by the outer head G of the rotor.

The case B of the machine is preferably of sectional construction, and in the particular case illustrated in the drawings it includes an inner section 25 secured to the housing 10 of engine A by suitable fasteners 26. The case includes an outer section 27 (end bell) in which there is a bearing mounting 28 supporting the bearing means C. A center or middle section 29 of the case is arranged between the end sections 25 and 27, and the several sections of the case are fixed or secured together so that they form a rigid unitary assembly. Suitable fasteners 30 are shown connecting the middle or center section 29 with the inner end section 25 while fasteners 31 connect the outer end section 27 to the middle of center section 29.

The bearing means C carried by the outer end section 27 of case B is supported by the bearing mounting 28 of case section 27 so that it is concentric with and spaced outwardly from the engine shaft 11. As shown in the drawings the bearing means C may include a suitable anti-friction bearing; for instance, a ball bearing having an outer race 32 carried by the mounting 28 and an inner race 33 receiving the trunnion portion 15 of rotor head G and an annular series of balls 34 between the races. The outer race is shown held in a liner or insert 28ª releasably held in a part 28ᵇ formed in the housing and fasteners 28ᶜ holding the insert in place.

The electrical element D of the machine, in this case being the armature, is an annular unit mounted stationary in the middle or center section 29 of case B. This element of the machine is shown as including an assembly of annular plates or laminations 35 which assembly is tightly held in the middle section 29 of case B by means of axially disposed ribs 36 in this section of the case. The annular assembly of plates 35 has recesses or slots formed in it from its interior to carry the coils or windings 37 of element D. It is to be understood that the windings 37 may be suitably connected together electrically and that connecting leads 40 may extend from the structure as through an opening 41 in the case B.

The element E of the machine, being the field element, is characterized by one or more pole pieces 42 and one or more windings 43 co-operating with the pole pieces. In the particular case under consideration the element E is characterized by a single pole piece 42 forming or having two pole portions. Element E has a single winding 43 combined or related to the pole piece as will appear from consideration of Figs. 2 and 3 of the drawings. The single pole piece 42 is an elongate assembly of plates or laminations 44 and is preferably provided with means carrying a dampener circuit. In the case illustrated the laminations 44 of the pole piece 42 are of iron or other magnetic material whereas the means for carrying the dampener circuit include plate-like elements 45 of material at opposite sides of the pole piece and overlying the laminations 44, and dampener bars 46 of material-like elements 45 extending between the plates 45 and through the laminations 44 as clearly shown in Fig. 7 of the drawings. Elements 45 and bars 46 are formed of a material that is a good electrical conductor. In practice the bars 46 have their ends 47 headed over at the plates 45 so that they serve as means holding the laminations 44 and the plates 45 assembled as a unit.

The winding 43 of the electrical element E is preferably a simple coil located centrally of the rotor and surrounding the pole piece 42. In the case illustrated the coil is combined with the pole piece 42 to completely surround the middle portion thereof leaving the pole piece with oppositely projecting ends or pole-shoes that fit within the armature element E with suitable working clearance. In accordance with the preferred arrangement, the elongate pole piece 42 is disposed so that it extends diametrically of the rotor and through the center thereof and its end or pole portions X projecting beyond the winding 43 are preferably widened as shown in Fig. 4 of the drawings. With this construction the pole piece 42 is in effect formed with a channel 48 which accommodates the winding 43 as clearly shown in Fig. 4 of the drawings.

The inner head F of the rotor is located within the inner case section 25 and is coupled to the engine shaft 11 by the means J. The head F in the case illustrated in the drawings includes a disc-shaped plate element 50 with a central opening 51 receiving a center pin 52 on the end of the engine shaft 11.

The means J is shown as including a plurality of drive pins 53 projecting from a flange 54 on the end in the engine shaft 11 which pins 53 project axially of the rotor and into openings 55 provided in the plate 50 of the head F.

In the preferred construction a suitable cushioning means is provided between the engine shaft and the head F of the rotor, and in the case illustrated the cushioning means includes annular cushions 65 of rubber or the like surrounding the pins which are engaged in the plate 50 of the head F. As shown in Fig. 2 of the drawings, a cushioning ring 65 surrounds the center pin 52 and each drive pin 53 and each ring of cushioning material is carried by or between sleeves 66 which may be formed of metal, or the like. Through the construction just described the inner head F of the rotor is centered relative to the engine shaft and is so coupled to the engine shaft as to rotate therewith.

The outer head G of the rotor includes a disc-shaped plate 70 having a boss portion 71 at its outer side and the trunnion 15 is carried by and projects from the boss 71.

In the preferred construction the plates 50 and 70 of the rotor heads are spaced apart so that the electrical element E of the machine is accommodated between them as shown in the drawings. It is preferred in practice that the opposing sides or faces of the plates 50 and 70 be formed or fashioned so as to suitably receive or accommodate the element E. In the case under consideration the plates have outer annular face portions 74 between which the pole piece 42 of element E is engaged, and they have recesses 75 which receive the winding 43. The bottoms 76 of recesses 75 are preferably rounded or made concave to follow the contour of the winding 43 as clearly illustrated in Fig. 3 of the drawings. With the construction just described the faces 74 of the rotor heads oppose each other and engage the end portions of the pole piece 42 while the end portions of the winding 43 facing axially of the rotor are received in the recesses 75.

The means H of the rotor coupling the heads F and G of the rotor serves to connect the heads so that the element E of the rotor is firmly held between the heads as shown throughout the drawings. In the particular case illustrated the means H includes a plurality of continuous rods 80 extending between the plates 50 and 70 of the heads F and G and through openings 81 provided through the pole portions X of the pole piece 42. In the particular case illustrated each continuous rod 80 has an end 82 threaded into one of the rotor heads and has an end portion 83 extending through an opening 84 in the other head rotor. A head 85 or portion 83 of each rod is seated in a socket 86 provided in the rotor head passing the portion 83.

The construction just described is clearly illustrated in Fig. 8 of the drawings from which it will be apparent that the rods 80 can be applied so that the several elements; namely, the rotor heads and element E are assembled or clamped tightly together as a unit.

In the case illustrated the means H includes additional tie rods which are sectional in form. Each sectional tie rod includes a middle section 90 with a section 91 threaded into one of the rotor heads and includes an end section 92 with a head 93 thereon engaged through the other head section of the rotor and threaded into the section 90 at 94. The section 90 of the construction just described occurs between the heads F and G of the rotor and must be the same length as element E as will be apparent from Fig. 3 of the drawings. When sectional ties of the character just described are employed, it is preferred to locate them in parts of the construction where they do not need to extend through the field element E. In the case illustrated the sectional tie rods are shown as occurring adjacent the sides of the winding 43 which are exposed as clearly illustrated in Fig. 4 of the drawings.

In the particular rotor construction illustrated in the drawings, the boss 71 provided on the outer side of plate 70 carries an auxiliary element of the machine and has the trunnion 15 of the rotor projecting from it to extend into the bearing means C. In the case illustrated the trunnion 15 is a part initially formed separate from the boss 71 of the head G, and in this case the boss 71 has an opening 95 in which portion the trunnion 15 is tightly held.

In the machine under consideration the armature 20 of the exciter K is carried on the boss 71 of the rotor head G while the field 21 of the exciter is held stationary by means of the ribs 36 occurring in the middle section 29 of case B. In the particular case illustrated the output from the exciter is carried by lines 96 which extend through the trunnion 15 to the rectifier L which is shown carried on the trunnion 15 outward of the bearing means C. The output from the rectifier L is carried by lines 97 extending to the winding 43 of element E.

From the foregoing description it will be apparent that the rotor of the machine is a fabricated unit made up essentially of the electrical element E and the heads F and G. With the construction provided the electrtical element E can be easily and quickly manufactured before being assembled with the heads F and G, and it will be apparent from the drawings that the construction is such as to permit of the element E being formed or designed so as to extend completely through or across the rotor without being in any way impaired or interfered with by a central shaft or other corresponding part.

In the form of the invention illustrated on sheet four of the drawings, the element E' of the rotor instead of being constructed to involve a single pole piece and but one winding is a more complicated construction and involves a multiplicity of pole pieces 42ª and a multiplicity of windings 43ª.

The several pole pieces 42ª are arranged in an annular assembly wherein each pole piece is radially disposed and the inner ends or poles of the pole pieces 42ª are connected together by tie portions 100 which combine to form a continuous annular unit which in effect carries the pole pieces 42ª, so that they project outwardly from it.

The windings 43ª are carried on the pole pieces 42ª, and the outer end portions or outer poles X' of the pole pieces 42ª may be enlarged as shown in Fig. 10 thus serving to retain the windings 43ª on the pole pieces. The pole construction just described is preferably formed of laminations and a suitable means may be provided for carrying a dampening circuit; for example, plates 45ª of conducting material may be arranged at opposite sides of the assembly of laminations and damper bars 46ª of conductive material may be provided to extend between the plates 45ª and through the pole portions X' as shown in the drawings. With the element E' constructed to be annular in form, it is preferably mounted concentric with the heads F' and G' of the rotor. When this construction is employed, the means H provided to connect or couple the heads of the rotor are preferably all continuous tie rods 80 that extend between the plates of the heads and through the element E' as clearly shown in Fig. 10 of the drawings.

In the form of the invention under consideration the auxiliary equipment carried by or related to the rotor is somewhat different from that first described. In this case the armature 20 of the exciter is carried by the hub 71 of rotor head G', and operates in a field 21 carried by case section 29. The trunnion portion 15 of the rotor in this case carries a commutator 110 adjacent the armature 20 of the exciter and slip rings 112 are carried on the trunnion portion 15 adjacent the commutator 110 and inward of the bearing means C. With auxiliary equipment of the character just described the output from the exciter is handled by the commutator and may be returned to the machine through the slip rings to energize the field element E' of the machine.

Having described the typical preferred forms and applications of my invention, I do not wish to be limited or restricted to the specific details herein set forth, but wish to reserve to myself any variations or modifications that may appear to those skilled in the art and fall within the scope of the following claim.

Having described my invention, I claim:

A rotor of the character described including, an electrical element including a diametrically disposed pole piece having flat end faces and diametrically opposite pole portions, and a winding surrounding the pole piece and projecting axially from the end faces thereof, heads at opposite sides of the element with openings receiving the projecting portions of the winding and engaged with the said faces, and means connecting the heads together with the said element between them, said means including rods extending between the heads and through said element and rods extending between the heads and at the exterior of said element, one of the heads having a portion adapted to carry an auxiliary electrical element, and each head having a part through which the rotor is adapted to be mounted in a machine.

References Cited in the file of this patent

UNITED STATES PATENTS

| Number | Name | Date |
|---|---|---|
| 830,849 | Richards et al. | Sept. 11, 1906 |
| 854,438 | Splitdorf | May 21, 1907 |
| 1,276,085 | Pontois | Aug. 20, 1918 |
| 1,332,966 | Werner | Mar. 9, 1920 |
| 1,504,608 | Cowin | Aug. 12, 1924 |
| 1,798,571 | Walther | Mar. 31, 1931 |
| 1,945,028 | D'Almaine et al. | Jan. 30, 1934 |
| 2,295,019 | Thompson | Sept. 8, 1942 |
| 2,385,369 | Niekamp | Sept. 25, 1945 |
| 2,485,474 | Brainard | Oct. 18, 1949 |
| 2,493,102 | Brainard | Jan. 3, 1950 |